(12) United States Patent
Moore et al.

(10) Patent No.: US 7,876,478 B1
(45) Date of Patent: Jan. 25, 2011

(54) CONVERTIBLE BACK COUNTER / TELLER STATION DOCUMENT PROCESSOR

(75) Inventors: Michael J. Moore, Beverly Hills, MI (US); John C. Gudenburr, Canton, MI (US); David B. Tratar, Dearborn, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 967 days.

(21) Appl. No.: 11/653,699

(22) Filed: Jan. 16, 2007

(51) Int. Cl.
*G06K 9/00* (2006.01)
*G07G 5/00* (2006.01)
*H04N 1/04* (2006.01)
*B65H 5/22* (2006.01)

(52) U.S. Cl. ............... 358/496; 271/3.05; 382/135; 382/136; 235/4

(58) Field of Classification Search ......... 430/120.3; 271/3.05, 3.06, 3.08, 3.14, 8.1, 280; 382/135, 382/136, 137, 138; 232/1 D, 2, 4 D, 64; 235/3, 4, 5, 17, 50 B, 379, 380
See application file for complete search history.

(56) References Cited

U.S. PATENT DOCUMENTS

| | | | |
|---|---|---|---|
| 6,771,180 B2 * | 8/2004 | Mizuta et al. | 340/674 |
| 7,090,121 B2 * | 8/2006 | Wanibe et al. | 235/379 |
| 7,103,206 B2 * | 9/2006 | Graves et al. | 382/135 |
| 7,628,279 B2 * | 12/2009 | Sekiguchi et al. | 209/534 |
| 2002/0113366 A1 * | 8/2002 | Watanabe et al. | 271/315 |
| 2005/0053183 A1 * | 3/2005 | Abe et al. | 377/94 |

* cited by examiner

*Primary Examiner*—Jerome Grant, II
(74) *Attorney, Agent, or Firm*—Honigman Miller Schwartz and Cohn LLP

(57) ABSTRACT

A compact, desktop document processor for capturing data and images from checks and other financial and payment-related documents includes a modular base unit. The modular base unit performs processing actions on financial and payment-related documents. The modular base unit is configured to operate in a teller station apparatus and is configured to operate in a back counter apparatus. The base unit includes an interface for connecting to an add-on component to match the base unit to workflow requirements. The base unit operates as the teller station apparatus when a hand feeder component is connected to the base unit at the add-on component interface. The base unit operates as the back counter apparatus when an automatic feeder component is connected to the base unit at the add-on component interface.

19 Claims, 5 Drawing Sheets

US 7,876,478 B1

CONVERTIBLE BACK COUNTER / TELLER STATION DOCUMENT PROCESSOR

BACKGROUND OF THE INVENTION

1. Field of the Invention

The invention relates to document processing, and to compact, desktop document processors for capturing data and images from checks and other financial and payment-related documents. The invention further relates to document processors designed for processing documents at a teller window, and to document processors designed for processing documents at a back counter or a back office.

2. Background Art

The "Check Clearing for the 21st Century Act" or the "Check 21 Act" was enacted by Congress to facilitate check truncation by authorizing substitute checks, to foster innovation in the check collection system without mandating receipt of checks in electronic form, and to improve the overall efficiency of the Nation's payments system. The Check 21 legislation has driven the demand for decentralized check imagers and sorters in financial institutions.

Banks, credit unions, and other institutions may have different internal workflow requirements for check processing operations. In addition, some institutions may have multiple internal workflows. Some institutions process checks at the teller window as the checks are received from the customer, while other institutions process the checks in batches at various intervals. The one-at-a-time check processing at the teller window does not require a check feeder or a multiple-pocket check stacker in the document processor. However, the processing of checks at a back counter or a back office requires a check feeder and a multiple-pocket check stacker due to the larger volume of checks that are processed in these workflows. The back counter device is significantly larger than a typical teller device due to the check feeder and the multiple-pocket stacker.

Counter space at a teller window is typically very limited due to other necessary devices such as computers and printers. Thus, the teller window environment usually is not compatible for a larger back counter type device. In addition, financial institutions are typically not willing to pay for check feeders and multiple-pocket check stackers that may not be necessary in their teller window workflow. In an existing approach to meeting these different internal workflow requirements for check processing operations, two unique apparatus designs are required. One apparatus is designed for the back office workflow, while another apparatus is designed for the teller window workflow.

For the foregoing reasons, there is a need for an improved document processor that is able to better meet different internal workflow requirements for check processing operations.

SUMMARY OF INVENTION

It is an object of the invention to provide a compact, desktop document processor for capturing data and images from checks and other financial and payment-related documents, wherein the document processor is designed in a modular form.

In one aspect of the invention, a convertible back counter/teller station document processor is designed in a modular form. The document processor includes a base unit. A check feeder and multiple-pocket check stacker may be added to or removed from the base unit.

In another aspect of the invention, when the document processor is required for a teller window application, a snap-in hand feeder extender may be added to the base unit. The feeder extender provides the teller clerk an entry area to guide the check into the device. The feeder extender also supports longer checks and assists with document alignment. In the exit area of the document processor, when the document processor is configured as a teller window apparatus, a location is provided for a single check to reside after processing.

In another aspect of the invention, when the document processor is required for a back office application, a snap-in check feeder is capable of automatic feeding batches of checks. When the document processor is configured as the back office device, a snap-in multiple-pocket check stacker provides pockets for sorting the checks into the pockets at the conclusion of processing. The check feeder may be an automatic, hands-off device that will insert a batch (10-200) of checks into the reader/imager. The multiple-pocket check stacker may be a mechanism that allows checks to be sorted into two or more pockets based on workflow criteria such as high value amounts, image quality, reader rejects, and others.

In accordance with the invention, a convertible back counter/teller station document reader/imager/sorter apparatus is designed in a modular form so that the apparatus can be adapted to match the different internal workflow requirements for check processing operations. The apparatus may be initially provided to a customer in the form of a teller window apparatus. The apparatus is designed in modular form such that the customer can upgrade the machine by adding a check feeder and/or a multiple-pocket check stacker, if desired, transforming the device from a teller window apparatus to a back counter apparatus.

In the preferred embodiment, the electronics in the base unit support the upgrades for check feeder and/or multiple-pocket check stacker operation. Advantageously, the cost and footprint of the teller device is significantly reduced by elimination of the check feeder and multiple-pocket check stacker components. Further, development costs of the convertible apparatus may be significantly reduced relative to the development costs for two unique products. Another advantage is that the shared components and assemblies for the teller version and the back counter version may result in lower production costs.

It is appreciated that document processors made in accordance with the invention are suitable for processing checks and other financial and payment-related documents. The description of check processing is exemplary, and aspects of the invention are applicable to the processing of other financial documents.

DETAILED DESCRIPTION OF THE PREFERRED EMBODIMENTS

Figure 1:
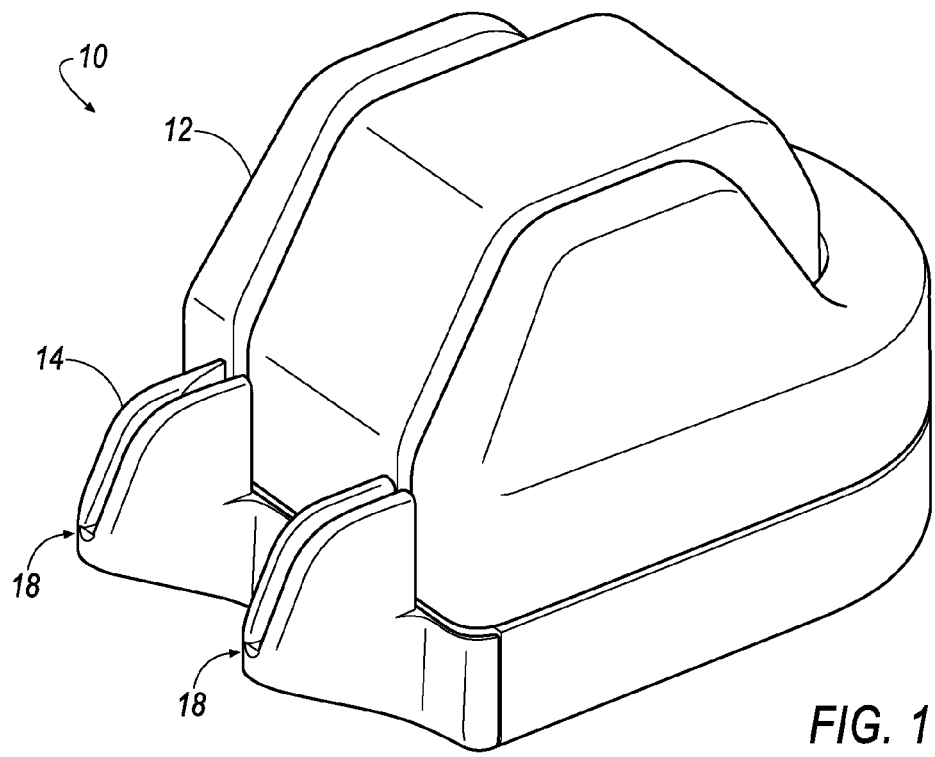
FIG. 1 illustrates a compact, desktop, convertible back counter/teller station document processor designed in a modular form in accordance with the invention, and shown configured as a teller station apparatus.
Figure 2:
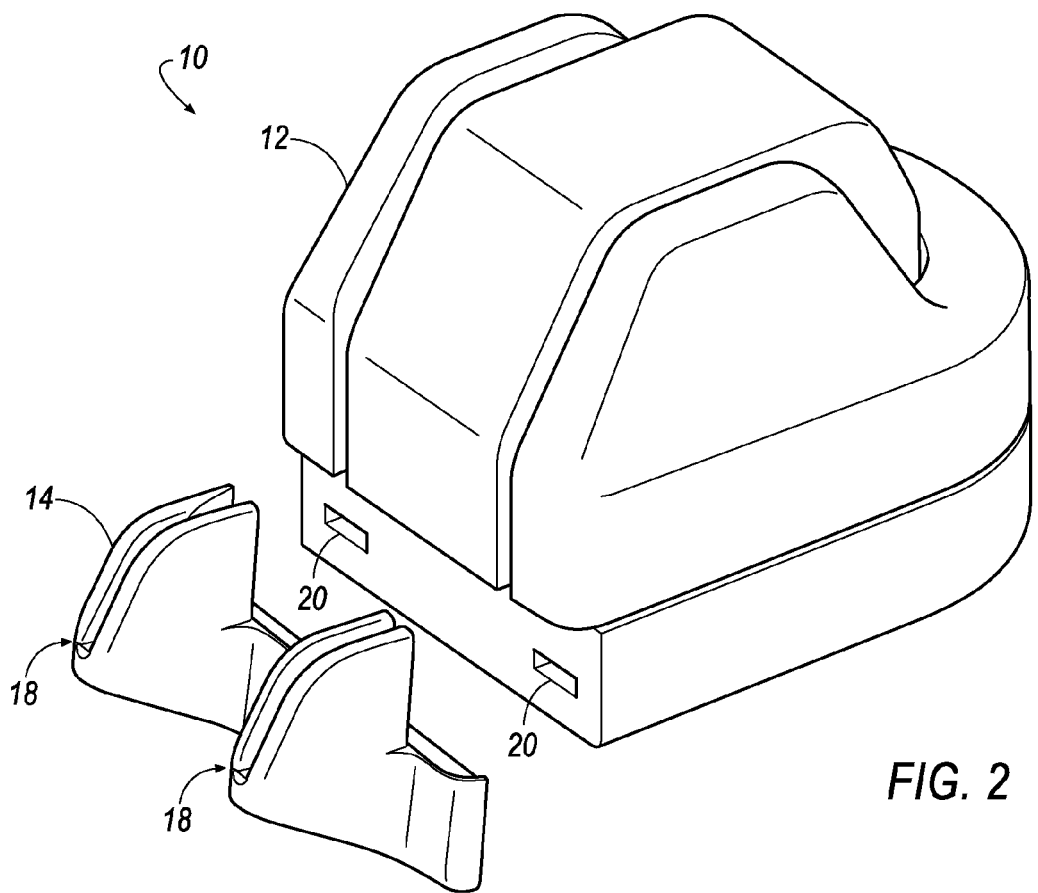
FIG. 2 illustrates the teller station apparatus of FIG. 1 with the snap-in hand feeder extender removed from the base unit.

With reference to FIGS. 1 and 2, in an exemplary embodiment of the invention, a compact, desktop, convertible back counter/teller station document processor is designed in a modular form. The document processor shown in FIGS. 1 and 2 is configured as a teller station apparatus 10, and includes a base unit 12 and a snap-in hand feeder extender 14. In general, the teller station or teller window apparatus 10 is used for decentralized document processing applications. More specifically, teller station apparatus 10 is used for one-at-a-time check processing at the teller window when there is no requirement for an automatic check feeder or a multiple-pocket check stacker. The compact design of the teller station apparatus 10 is suitable for the typically very limited counter space at a teller window, usually due to other necessary devices such as computers and printers.

The snap-in hand feeder extender 14 provides the teller clerk with an area 16 to guide the check into the apparatus 10, supports longer documents, and assists with document alignment. An exit area 18 provides a location for a single check to reside after processing. It is appreciated that the teller station apparatus 10 is suitable for processing checks as well as other financial and payment-related documents.

The teller station apparatus 10 may be constructed to perform any number of known document processing actions as appreciated by one of ordinary skill in the art. Suitable electronics and mechanical mechanisms are located within base unit 12. For example, teller station apparatus 10 may perform front and rear image capture, magnetic ink character recognition (MICR) reading, optical character recognition (OCR) reading, endorsing, and/or bar code reading depending on the application. Advantageously, the electronics and mechanical mechanisms required for the document processing actions are provided within base unit 12. In accordance with the invention, the document processor has a modular design centered around base unit 12. To construct teller station apparatus 10, snap-in feeder extender 14 is simply snapped into base unit 12 at apertures 20. The apparatus may be provided with a suitable network connection interface such as Ethernet or Universal Serial Bus (USB).

Put another way, the invention comprehends a compact, desktop document processor designed in a modular form. The document processor shown in FIGS. 1 and 2 is configured as a teller station apparatus 10. The details of the implementations for the electronics and mechanical mechanisms for performing processing actions may take any suitable forms. The processing actions themselves may vary. According to the invention, the same modular base unit 12 is used for multiple configurations of the document processor, including configuration for a teller station and configuration for a back counter. The electronics in base unit 12 support operation as a teller station apparatus and operation as a back counter apparatus. Base unit 12 may be configured for the needed mode of operation via a computer or other suitable device connected to the base unit 12 through a network interface. Another possibility is that the snap-in features for the add-on devices and the corresponding receiving features on base unit 12 are configured such that base unit 12 detects which add-ons are presently attached, and operates accordingly. Thus, many implementations of the invention are possible in accordance with the concept of using the same modular base unit 12 for multiple document processor configurations.

Figure 3:
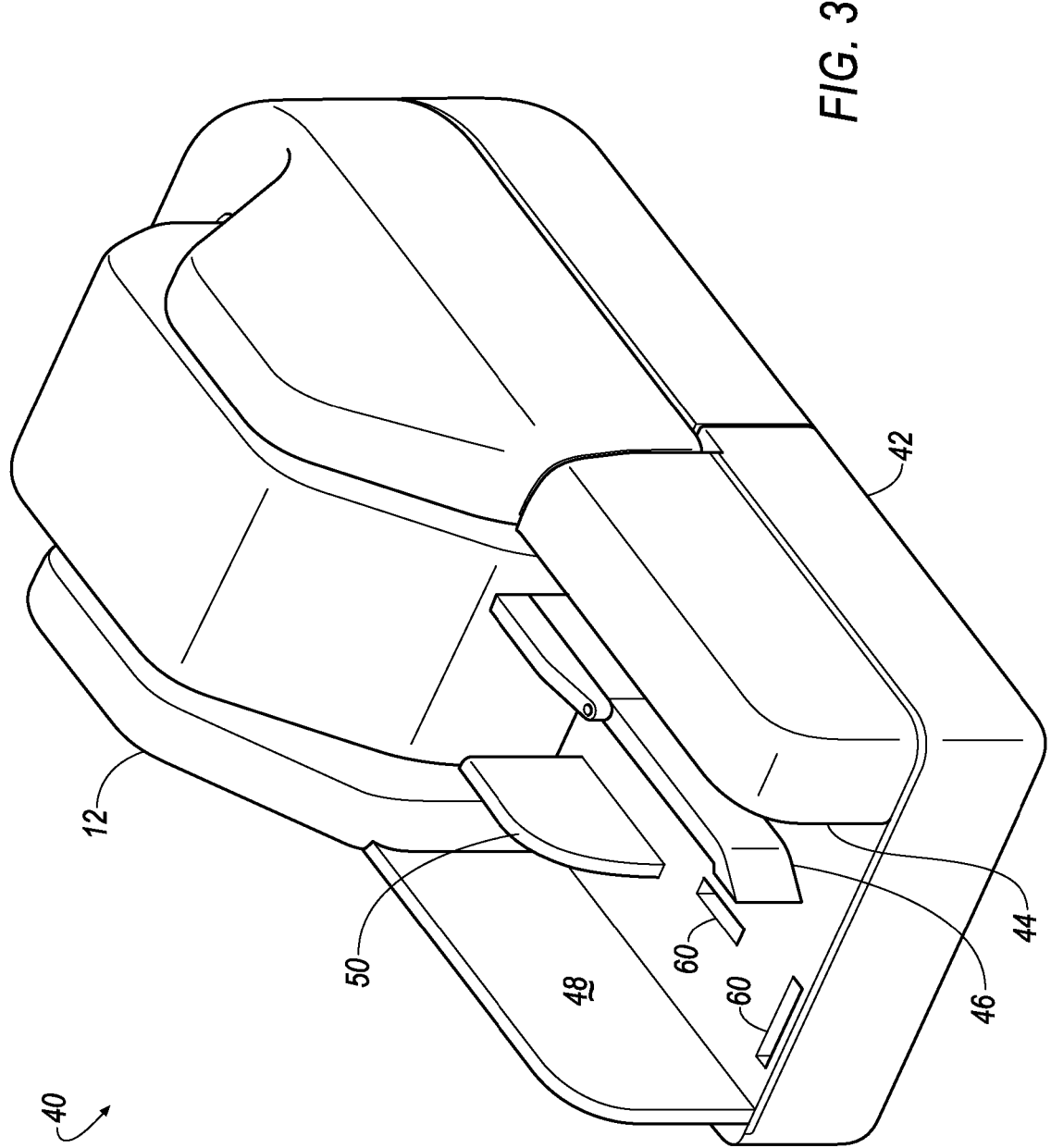
FIG. 3 illustrates a compact, desktop, convertible back counter/teller station document processor designed in a modular form in accordance with the invention, and shown configured as a back counter apparatus including a snap-in check feeder to provide automatic feeding of batches of checks.
Figure 4:
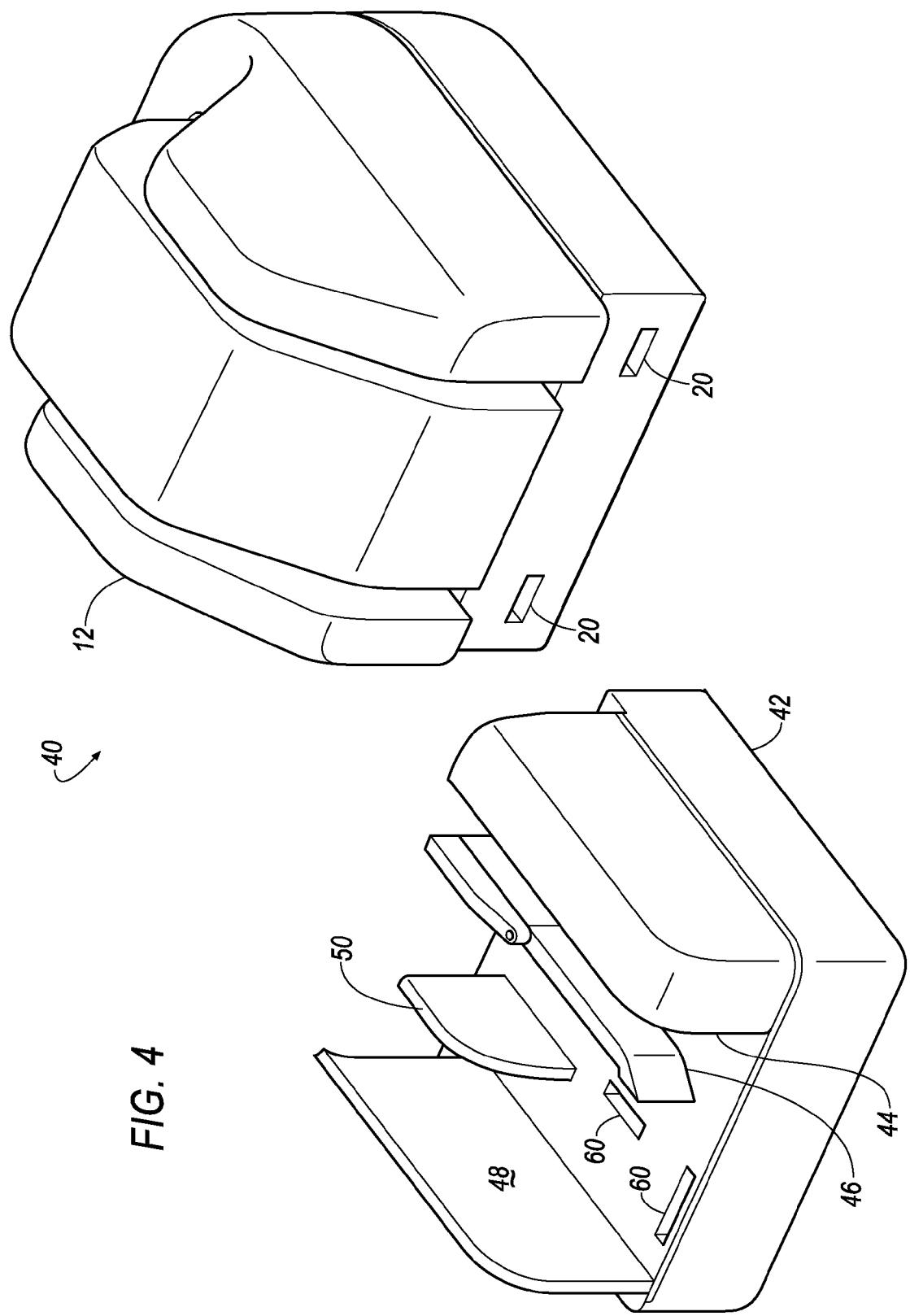
FIG. 4 illustrates the back counter apparatus of FIG. 3 with the snap-in check feeder removed from the base unit.

With reference to FIGS. 3 and 4, in the exemplary embodiment of the invention, the compact, desktop, convertible back counter/teller station document processor is configured as a back counter apparatus 40. Back counter apparatus 40 includes the same base unit 12 as in the teller station configuration shown in FIGS. 1 and 2. In addition to base unit 12, back counter apparatus 40 includes a snap-in check feeder 42. Snap-in check feeder 42 is shown attached to base unit 12 in FIG. 3, and is shown removed from base unit 12 in FIG. 4. Snap-in check feeder 42, in the preferred embodiment, is an automatic, hands-off device that will feed a batch (10-200) of checks into the base unit 12.

Back counter apparatus 40 is used for batch processing at a back counter or back office in decentralized document processing applications. Snap-in check feeder 42 receives and holds a batch of checks between side wall portion 44 and spring-loaded flag 46 which presses up against the last document in the loaded batch to keep the checks together. As shown, a single pocket for receiving the processed checks is formed by side wall portion 48 and retaining wall 50. It is appreciated that back counter apparatus 40 is suitable for processing checks as well as other financial and payment-related documents.

As base unit 12 is the same in the back counter configuration as in the teller station configuration, suitable electronics and mechanical mechanisms are located within base unit 12. For example, back counter apparatus 40 may perform front and rear image capture, magnetic ink character recognition (MICR) reading, optical character recognition (ORC) reading, endorsing, and/or bar code reading depending on the application. In accordance with the invention, the document processor has a modular design centered around base unit 12. To construct back counter apparatus 40, snap-in check feeder 42 is simply snapped into base unit 12 at apertures 20. The snap-in check feeder 42 includes apertures 60 for adding a multiple-pocket check stacker.

Figure 5:
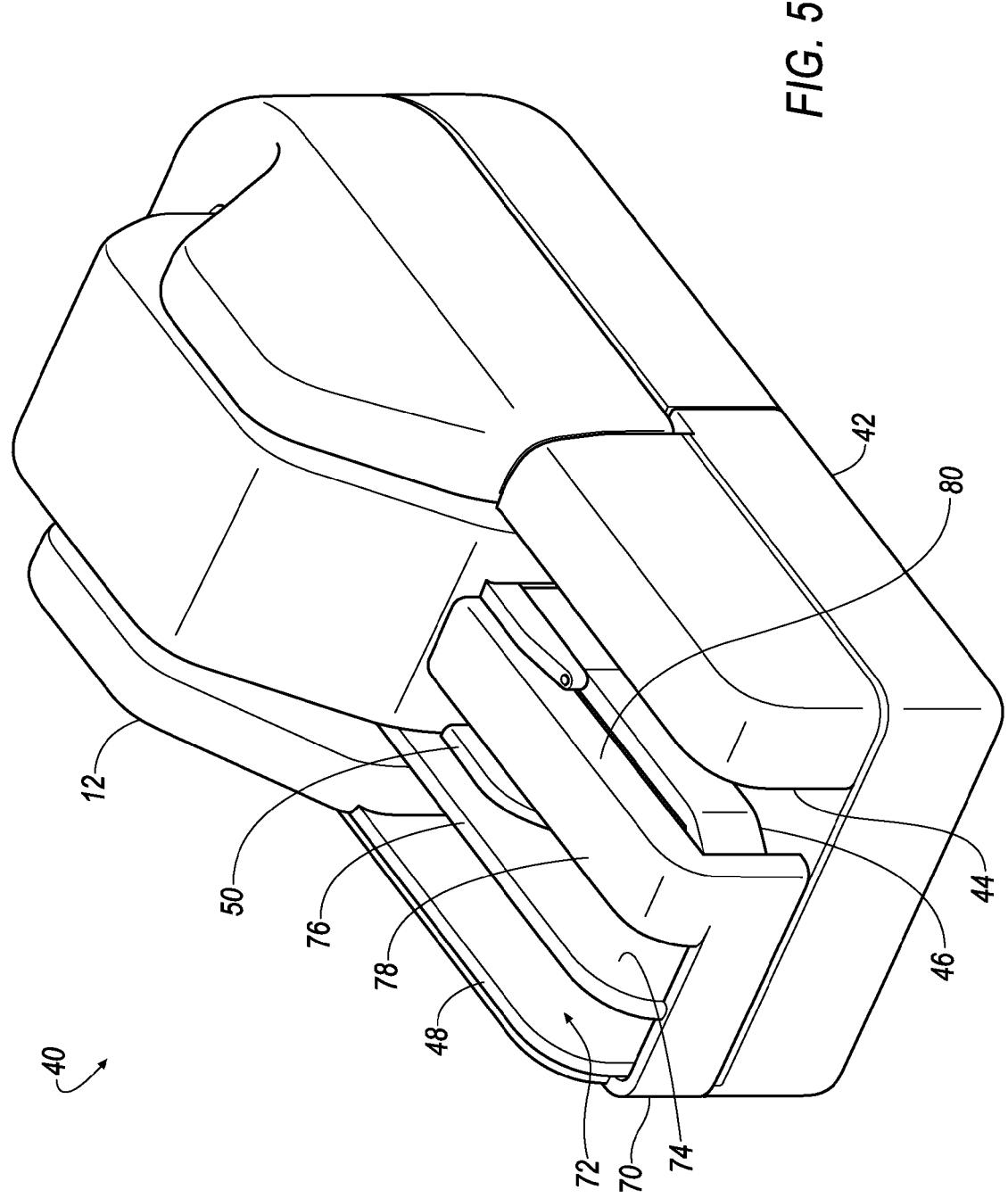
FIG. 5 illustrates a compact, desktop, convertible back counter/teller station document processor designed in a modular form in accordance with the invention, and shown configured as a back counter apparatus including a snap-in check feeder and a snap-in multiple pocket check stacker.
Figure 6:
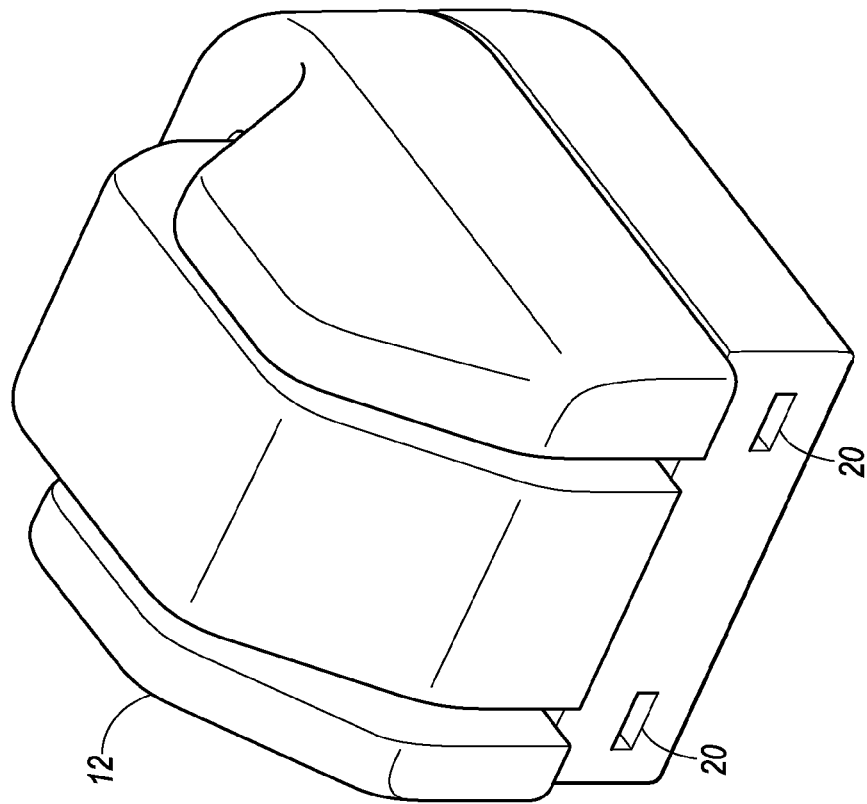
FIG. 6 illustrates the back counter apparatus of FIG. 5 with the snap-in check feeder and the snap-in multiple pocket check stacker removed from the base unit.
Figure 6:
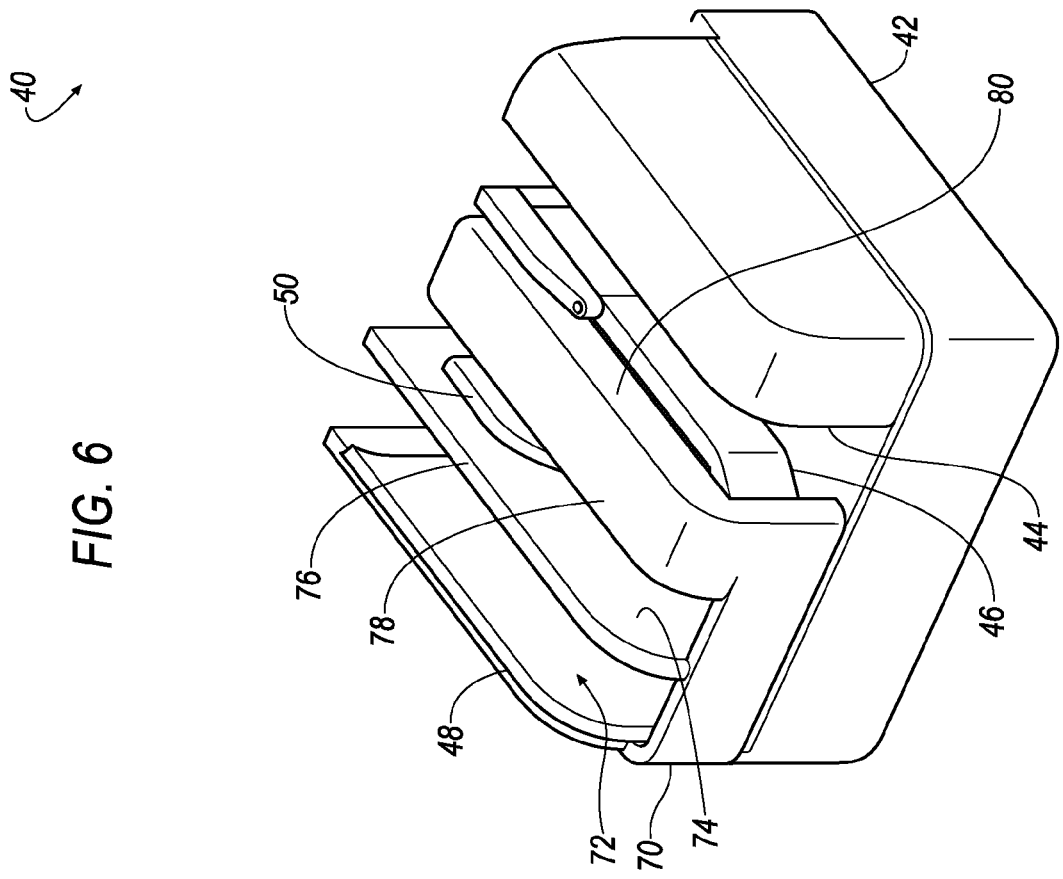

With reference to FIGS. 5 and 6, in the exemplary embodiment of the invention, back counter apparatus 40 may receive snap-in multiple pocket check stacker 70. The multiple-pocket check stacker 70 allows checks to be sorted into, as shown, two pockets based on criteria such as high value amounts, image quality, reader rejects, and others. The snap-in check stacker 70 snaps into apertures 60 in the snap-in check feeder 42 for applications where both a check feeder and a check stacker are required.

Check stacker 70 is preferably in the form of a single piece body that forms first and second pockets 72 and 74, respectively. First pocket 72 is bound by side wall 48 of the snap-in check feeder 42, and divider wall 76 of the check stacker body. Second pocket 74 is bound by divider wall 76 and wall 78 defined by the check stacker body. The check stacker 70 also defines a recessed area 80 behind flag 46.

Embodiments of the invention have many advantages. The convertible back counter/teller station apparatus is designed in modular form with common base unit 12 and snap-in add-on components. In this way, the document processor can be adapted to match different workflow requirements. In addition, the modular design makes it possible to upgrade a teller station apparatus to a back counter apparatus by changing the snap-in components. In a preferred embodiment, the back counter apparatus may have a length of about 14.75 inches, a depth of about 6.25 inches, and a height of about 8.50 inches. The teller station apparatus, accordingly, has a further reduced length.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A document processor kit, comprising:
   a base unit including an interface;
   electronics disposed within the base unit, wherein the electronics provide
      means for performing one or more document processing actions, wherein the one or more document processing actions include
         endorsing, front image capturing, rear image capturing, magnetic ink character recognition reading, optical character recognition reading and bar code reading;
   a first component; and
   a second component, wherein one of the first component and the second component is adapted to be selectively attached to the base unit at the interface, wherein the first component provides
      means for facilitating manual insertion of one document into the base unit and subsequently retaining the one document after the base unit performs the one or more document processing actions, wherein the second component provides
      means for facilitating automatic insertion of one or more documents of a batch of documents into the base unit and subsequently retaining the one or more documents of the batch of documents after the base unit performs the one or more document processing actions.

2. The document processor kit of claim 1, wherein the interface is formed by at least one aperture in the base unit, wherein each of the first component and the second component includes at least one member corresponding to the at least one aperture in order to permit one of the first component and the second component to be selectively attached to the base unit.

3. The document processor kit of claim 2, wherein a configuration of the at least one aperture and the at least one member provides
   means for snap-fit connecting one of the first component and the second component to the base unit.

4. The document processor kit of claim 1, wherein the first component includes
   a flange,
   a first trough connected to the flange, and
   a second trough connected to the flange, wherein the first trough forms a check entrance guide, wherein the second trough forms a check exit guide, wherein the check entrance guide provides
      means for guiding the one document into the base unit, wherein the check exit guide provides
      means for guiding the one document out of the base unit after the base unit performs the one or more document processing actions.

5. The document processor kit of claim 1 wherein the second component includes
   a platform having a top surface,
   a first sidewall extending away from the top surface,
   a second sidewall extending away from the top surface,
   a retaining wall extending away from the top surface, wherein the retaining wall is arranged between the first sidewall and the second sidewall, and
   a spring-loaded flag extending away from the top surface, wherein the spring-loaded flag is arranged between the retaining wall and the second sidewall.

6. The document processor kit of claim 5, wherein the one or more documents of the batch of documents are disposable upon the top surface and arranged between the spring-loaded flag and the second sidewall, wherein the spring-loaded flag is biased toward the one or more documents of the batch of documents to provide
   means for pressing up against the one or more documents of the batch of documents for keeping the one or more documents of the batch of documents together.

7. The document processor kit of claim 5 wherein the first sidewall and the retaining wall form a trough that provides
   means for receiving the one or more documents of the batch of document from the base unit after the base unit performs the one or more document processing actions.

8. The document processor kit of claim 5, wherein the top surface forms at least one aperture in the second component, wherein the document processor kit further comprises:
   a third component, wherein the third component is connected to the second component, wherein the third component includes
      a base platform having a base surface,
      an end wall extending away from the base surface, and
      a divider wall extending away from the base surface, wherein the divider wall opposingly faces the first sidewall, wherein a first portion of the base surface, the first sidewall and the divider wall forms
         a first pocket,
      wherein the end wall opposingly faces the divider wall, wherein a second portion of the base surface, the end wall and the divider wall forms
         a second pocket,
      wherein the first pocket and the second pocket provides
         means for sorting the one or more document of the batch of documents after the base unit performs the one or more document processing actions in view of criteria including one or more of: high value amounts, image quality and reader rejects.

9. The document processor kit of claim 8, wherein the third component includes at least one member corresponding to at least one aperture formed in the top surface of the platform of the second component in order to permit the third component and the second component to be selectively attached, wherein a configuration of the at least one aperture and the at least one member provides
   means for snap-fit connecting the third component to the second component.

10. A compact, desktop document processor for capturing data and images from checks and other financial and payment-related documents, the document processor comprising:
    a modular base unit for performing processing actions on financial and payment-related documents, the modular base unit being configured to operate as a teller station apparatus and being configured to operate as a back counter apparatus, the base unit including an interface for connecting to an add-on component to match the base unit to workflow requirements; and
    wherein the base unit operates as the teller station apparatus when a hand feeder component is connected to the base unit at the add-on component interface, and wherein the base unit operates as the back counter apparatus when an automatic feeder component is connected to the base unit at the add-on component interface;

an automatic feeder component attached to the base unit, thereby configuring the document processor as the back counter apparatus; and a multiple pocket document stacker component attached to the base unit, wherein the multiple pocket document stacker component attaches to the base unit via attachment to the automatic feeder component, wherein the multiple pocket document stacker defines first and second pockets to allow documents to be sorted by the base unit based on workflow criteria.

11. A compact, desktop document processor for capturing data and images from checks and other financial and payment-related documents, the document processor comprising:

a compact, desktop, modular base unit for performing processing actions on financial and payment-related documents, the modular base unit being configured to operate as a teller station apparatus and being configured to operate as a back counter apparatus, the base unit including a connector;

an add-on component connected to the connector of the base unit, the add-on component matching the base unit to workflow requirements; and wherein the base unit operates as the teller station apparatus when the add-on component is a hand feeder component, and wherein the base unit operates as the back counter apparatus when the add-on component is an automatic feeder component, wherein the add-on component comprises:

an automatic feeder component attached to the base unit, thereby configuring the document processor as the back counter apparatus; and a multiple pocket document stacker component attached to the base unit, wherein the multiple pocket document stacker component attaches to the base unit via attachment to the automatic feeder component, wherein the multiple pocket document stacker defines first and second pockets to allow documents to be sorted by the base unit based on workflow criteria.

12. A document processor, comprising:

a base unit including electronics disposed within the base unit for performing one or more document processing actions including endorsing, front image capturing, rear image capturing, magnetic ink character recognition reading, optical character recognition reading and bar code reading, wherein the base unit includes a snap-fit interface in order to permit selective snap-fit attachment of one of a first component and a second component to the base unit.

13. The document processor according to claim 12, wherein the first component provides means for facilitating manual insertion of one document into the base unit and subsequently retaining the one document after the base unit performs the one or more document processing actions, wherein the second component provides means for facilitating automatic insertion of one or more documents of a batch of documents into the base unit and subsequently retaining the one or more documents of the batch of documents after the base unit performs the one or more document processing actions.

14. The document processor of claim 12, wherein the first component includes a flange, a first trough connected to the flange and a second trough connected to the flange, wherein the first trough forms a check entrance guide, wherein the second trough forms a check exit guide, wherein the check entrance guide provides means for guiding the one document into the base unit, wherein the check exit guide provides means for guiding the one document out of the base unit after the base unit performs the one or more document processing actions.

15. The document processor of claim 12, wherein the second component includes a platform having a top surface, a first sidewall extending away from the top surface, a second sidewall extending away from the top surface, a retaining wall extending away from the top surface, wherein the retaining wall is arranged between the first sidewall and the second sidewall and a spring-loaded flag extending away from the top surface, wherein the spring-loaded flag is arranged between the retaining wall and the second sidewall.

16. The document processor of claim 15, wherein the one or more documents of the batch of documents are disposable upon the top surface and arranged between the spring-loaded flag and the second sidewall, wherein the spring-loaded flag is biased toward the one or more documents of the batch of documents to provide means for pressing up against the one or more documents of the batch of documents for keeping the one or more documents of the batch of documents together.

17. The document processor of claim 15, wherein the first sidewall and the retaining wall form a trough that provides means for receiving the one or more documents of the batch of document from the base unit after the base unit performs the one or more document processing actions.

18. The document processor of claim 15, wherein the top surface forms at least one aperture in the second component, wherein the document processor kit further comprises: a third component, wherein the third component is connected to the second component, wherein the third component includes a base platform having a base surface, an end wall extending away from the base surface, and a divider wall extending away from the base surface, wherein the divider wall opposingly faces the first sidewall, wherein a first portion of the base surface, the first sidewall and the divider wall forms a first pocket, wherein the end wall opposingly faces the divider wall, wherein a second portion of the base surface, the end wall and the divider wall forms a second pocket, wherein the first pocket and the second pocket provides means for sorting the one or more document of the batch of documents after the base unit performs the one or more document processing actions in view of criteria including one or more of: high value amounts, image quality and reader rejects.

19. The document processor of claim 18, wherein the third component includes at least one member corresponding to at least one aperture formed in the top surface of the platform of the second component in order to permit the third component and the second component to be selectively attached, wherein a configuration of the at least one aperture and the at least one member provides means for snap-fit connecting the third component to the second component.

* * * * *